3,392,048
PIGMENT-COATED PAPER PRODUCTS HAVING A BINDER OF PROTEIN AND A CONJUGATED DIENE POLYMER THAT CAN FORM A REVERSIBLE COLLOIDAL SOLUTION
Milan A. Rolik, Akron, Ohio, assignor to The General Tire & Rubber Company, a corporation of Ohio
No Drawing. Filed Jan. 8, 1965, Ser. No. 424,176
7 Claims. (Cl. 117—155)

ABSTRACT OF THE DISCLOSURE

A pigment-coated paper product having improved pick resistance is obtained by using a coating color consisting of
(a) a binder consisting essentially of
  (1) the emulsion-polymerized solid polymer consisting of 54 to 82% of an unsubstituted or mono halogen-substituted conjugated diene having 4 to 8 carbon atoms, 14 to 30% of a copolymerizable alpha, beta, mono ethylenically unsaturated carboxylic acid, 4 to 15% of a copolymerizable alpha, beta, mono ethylenically unsaturated nitrile, and 0 to 28% of a copolymerizable vinylidene compound that forms in an alkaline aqueous media at a pH of 8.5 or more a reversible colloidal solution existing in a state of thermodynamic equilibrium, and
  (2) a proteinaceous material essentially soluble in an alkaline aqueous media at a pH of 8.5 or more,
(b) a finely divided pigment,
(c) water, and
(d) sufficient mono acidic alkaline material to give a pH of at least 8.5.

---

This invention relates to improvements in proteinaceous-based paper coatings. More particularly, this invention relates to a new polymer, an improved paper coating composition incorporating said polymer, and to coated paper products produced therewith.

A major portion of commercial paper coatings comprise a pigment, such as clay or calcium carbonate and a proteinaceous adhesive or binder. The adhesive binds the pigment particles to each other and to the paper substrate. The pigment portion of the coating provides the finished paper with the important properties of gloss, brightness and opacity. It, furthermore, fills in the irregularities in the paper surface, making it uniform and absorbent for printing.

Widely used as adhesives are solubilized, natural occurring materials such as casein or soya protein, normally in amounts of 14 to 20 parts per 100 parts of pigment. These materials as presently utilized, however, have deficiencies, the major ones being:

(1) They require a high adhesive to pigment-solids ratio, which reduces brightness, hiding power and ink receptivity of the finished paper.

(2) They give high coating viscosities, which preclude use in certain type coating equipment.

(3) They provide coated papers which are hard surfaced and lacking in flexibility so that the coating easily ruptures on bending or distortion.

(4) They give coated papers of limited optical and water resistance properties.

These deficiencies have been alleviated by the partial substitution of synthetic polymer lattices for a portion of the water solubilized natural proteinaceous adhesive. The resultant admixture provides a coating which is in most respects superior to that which is devoid of latex. Butadiene/styrene latices, in particular, have been widely used in this application. The inherent thermoplasticity of the butadiene/styrene latex makes calendering easier, enhances gloss and adds to the smoothness and flexibility of the finished coating. Water resistance is also substantially improved. Moreover, the latex not only reduces the viscosities for application at the required high solids content but gives the desirable rapid drying.

In general, it is desirable that the least amount of adhesive commensurate with satisfactory bonding be used. Any adhesive in excess of this minimum increases cost and reduces the brightness, hiding power, and ink receptivity of the paper coating. Hence, efforts have been directed toward the designing of new and different adhesives with greatly increased binding efficiency in order to reduce the amount of adhesive and still maintain coating strength. To date, improvements in strength have not been especially noteworthy. This has been found to be true with current standard coatings that utilize as the principal adhesive a mixture of a proteinaceous material and a synthetic latex, be it butadiene/styrene, acrylic or polyvinyl acetate. With these systems, it has been found that high binder or adhesive levels must still be utilized in order to obtain pigment coated papers of satisfactory quality.

It is therefore an object of this invention to provide a new class of synthetic polymers which will, in combination with a proteinaceous material, provide an unusually high pigment binding capacity at low adhesive levels in mineral pigment paper coatings. It is a further object of this invention to provide new paper coating formulations based on the aforementioned class of synthetic polymers admixed with natural proteinaceous materials that have a total adhesive to pigment ratio in the range of 7 to 100 or less, and that when compared to standard coatings containing, for example, 12 parts of adhesive, are equal or better in pick strength. Brightness, hiding power and ink receptivity are also significantly increased in the new coatings while the other necessary properties of easy calendering, gloss, smoothness, flexibility and wet rub resistance are maintained.

The above objects can be attained with a new class of synthetic polymers obtained when 100 parts by weight of a mixture of monomers comprising 54 to 82 parts of a conjugated diene, 14 to 30 parts of an alpha, beta-ethylenically unsaturated acid, 4 to 15 parts of an alpha, beta-ethylenically unsaturated nitrile, and 0 to 28 parts of a copolymerizable vinylidene compound, are substantially completely polymerized to a polymer that forms in an alkaline aqueous medium a reversible colloid solution that exists in the equilibrium state of a true solution. This new class of synthetic polymers, when admixed with proteinaceous material in an alkaline aqueous medium at a weight ratio of from 9:1 to 1:9, can be utilized as the principal or sole adhesive in paper coating formulations at adhesive levels appreciably lower than the minimum level attainable with the mixed proteinaceous/synthetic polymer latex systems presently utilized in the art.

The primary monomeric building block utilized to form the unique synthetic polymer of this invention is a conjugated diene monomer. Because of the properties of elasticity or flexibility imparted to the polymer, hydrocarbon conjugated dienes of 4 to 8 carbon atoms, either unsubstituted or containing no more than one halide substituent, are preferred. Illustrative of the monomers that may be employed are butadiene-1,3; isoprene; 2,3-dimethyl-butadiene-1,3; 2-ethyl-butadiene-1,3; 1,4-dimethyl-butadiene-1,3; pentadiene-1,3; 3-methyl-pentadiene-2,4; piperylene, chloroprene and 2-fluorobutadiene-1,3. Butadiene is particularly useful in that it is readily available and can be copolymerized with a large number of other monomers to give desirable polymers. The conjugated diene monomers may be used either singularly or in admixture with each other.

The other monomeric building blocks required to form the polymers of this invention are an alpha, beta-ethylenically unsaturated acid and an alpha, beta-ethylenically unsaturated nitrile. These two monomers utilized in particular quantities act in concert to provide the unique colloidal properties of the polymer and impart to it the ability to tightly bind the pigment both to itself and to the paper substrate. Though the exact reason for the effectiveness of these two types of monomers is not fully understood, it is theorized that the carboxyl groups of the unsaturated acid, when built into the polymer compositions of the invention, impart to the polymer a hydrophilic character and the ability to bind the pigment in the coating to itself and to the paper substrate. The nitrile monomer, it is believed, directs the copolymerization of the acid monomer in such a manner that it adds to the growing polymer chain during the entire course of the polymerization, thus giving a polymer having the hydrophilic carboxyl groups distributed along the polymer chain in a relatively uniform manner. This uniform distribution of the carboxyl groups is thought to contribute to the unique character of the polymer that enables it to form in alkaline aqueous media a true colloid solution.

The alpha, beta-ethylenically unsaturated acid that may be used contains one, two, or more carboxylic (—COOOH) groups and includes, but is not limted to, for example, acrylic acid, methacrylic acid, alpha-chloroacrylic acid, maleic acid, fumaric acid, alpha-chloroitaconic acid. When two or more carboxyl groups are present, the anhydride form of the acid, such as maleic and fumaric anhydride, may be used. Likewise, there may be used the partial esters or amides of unsaturated polycarboxylic acids such as mono methyl maleate, mono ethyl fumarate and N-butyl maleic monoamide. These acid monomers may be used singly or in combination with one another. Best results in terms of ease of polymerization and the ability to impart to the polymer desirable colloidal properties and binding efficiency have been observed when monocarboxylic acid monomers such as methacrylic acid or mono-methyl maleic acid make up the sole or major weight portion of the acid monomer employed and therefore are preferred in the practice of this invention.

The alpha, beta ethylenically unsaturated nitriles utilized to form the new synthetic polymer compositions of this invention have one or two nitrile substituents and include, but are not limited to, for example, acrylonitrile, alpha-alkyl substituted acrylonitriles, such as methacrylonitrile or ethacrylonitrile, maleonitrile, and fumaronitrile. They may be used singly or in combination. Because of its low cost, availability, and the desirable properties it confers to the polymers, acrylonitrile is the nitrile monomer of choice.

In addition to the three basic monomer building blocks which must be present, the unique synthetic polymer of this invention may likewise contain up to 28% by weight of an interpolymerizable vinylidene monomer. Illustrative of monomers which may be utilized are: vinyl aromatic monomers such as styrene, alpha methyl styrene, alpha chloro styrene, vinyl naphthalene, vinyl toluene, 2,4-dichlorostyrene; esters of acrylic and alpha substituted acrylic acids, such as methyl methacrylate, ethyl acrylate, butyl acrylate, beta hydroxy propyl methacrylate, methyl chloroacrylate, methyl ethacrylate; esters of alpha, beta ethylenically unsaturated polybasic acids, such as diethyl maleate and dibutyl fumatrate; esters of alpha-beta ethylenically unsaturated amides such as acrylamide, methacrylamide and N-methyl methacrylamide; vinyl esters such as vinyl acetate, vinyl stearate and vinyl benzoate and vinyl ethers such as ethyl vinyl ether, butyl vinyl ether and dichloroethyl vinyl ether. These vinylidene monomers may be employed either singly or in combination where modification of the basic polymer composition is desired to attain special properties. As an illustration, the vinyl aromatic monomers or methyl methacrylate might be employed where increased hardness and/or thermoplasticity is required. The higher alkyl esters of acrylic, methylacrylic or maleic acid might be used where a higher order of color stability is desired but with little or no sacrifice in polymer flexibility. Where the ability to be crosslinked with water-soluble phenol formaldehyde or amino formaldehyde resins is sought, monomers containing reactive functional groups such as acrylamide, methylolacrylamide or hydroxyethyl methacrylate would be interpolymerized in the polymer.

Besides the types, the amounts of the monomers used in the production of the polymer are critical in that if certain relatively narrow ranges are not adhered to, the resulting polymer will not have the desired utility in the particular end application of a paper coating adhesive.

As delineated previously, the limits of the various components on the basis of a total monomer content of 100 parts, are 54 to 82 parts of the conjugated diene, 0 to 28 parts of the vinylidene compound, 14 to 30 parts of the alpha, beta carboxylic acid, and 4 to 15 parts of the nitrile compound. If less than the minimum amount of diene is used, the resulting polymer when used in combination with a proteinaceous adhesive as an adhesive for paper coating will not have the desired and required strength characteristics. The maximum amount of diene is limited by the necessity of having present at least 14 parts of the carboxylic acid and 4 parts of the nitrile.

As to the acid monomer used, if the minimum 14 parts are not used, the resulting polymer will not function synergistically with the proteinaceous adhesives to provide a coating with the strength required for use in modern high speed printing equipment at lower total adhesive levels. Where more than 30 parts of carboxyl monomer are used, there is an increase in the polymer cost, and the polymer is found to be a less efficient binder in combination with the proteinaceous material.

The nitrile compound should not exceed more than 15 parts of the polymer. If this value is exceeded, there is a tendency to yellow when exposed to heat. If less than 4 parts of the nitrile monomer are present, the polymer does not have desirable colloidal characteristics, showing a decrease in efficiency in combination with the proteinaceous material. The optimum amount for most effective distribution of the carboxyls will vary with the percentages of the other monomer components and within the stated limits, the greater the amount of nitrile, the more uniform the distribution of carboxyl groups with increase in efficiency of the polymer as a paper coating adhesive. Generally, it has been found that a higher order of uniformity of distribution of the carboxyl groups is required where low levels of unsaturated acid monomer (e.g., 14 to 20 parts) are utilized to make the polymer. In these cases, this can conveniently be obtained by using high levels of the unsaturated nitrile monomers such as around 10 to 15 parts. Conversely, where high acid monomer levels are employed, such as 21 to 30 parts, less of the acrylonitrile monomer needs to be used. Usually with these higher levels 4 to 10 parts of the nitrile monomer will suffice.

A consideration of the foregoing leads one to the conclusion that there is a very intricate and involved relationship among the various components if a polymer satisfactory for the required end use is to be produced. In addition to the above-described deficiencies which occur if the specified limits are ignored, the resulting polymer will not have the combination of desirable characteristics required. It is not yet fully understood how or why the various components affect these desirable characteristics, but it is definitely established that they do.

The polymerization is generally carried out using an emulsion system such as is described in Vinyl and Related Polymers, C. E. Schildknecht, John Wiley & Sons, 1952, and in Emulsion Polymerization, F. A. Bovey et al., Interscience Publishers, Inc., 1955. There may also be used processes wherein organic solvents constitute the primary polymerization media.

In the synthesis of the synthetic polymer of this invention by the preferred aqueous polymerization system, a polymerization modifying compound is usually used. The quantity used will be such as to limit the molecular weight of the polymer sufficiently so that it can readily form in an alkaline aqueous solvent a true colloid solution. Especially efficient modifying compounds are alkyl mercaptans of 8 to 16 carbon atoms, such as tertiary octyl or tertiary dodecyl mercaptan, utilized usually in amounts ranging from 1 to 6 parts per 100 parts by weight of monomer charged. The exact amount within this general range will depend upon a number of variables such as the type of mercaptan utilized, the time of addition, the composition of the desired polymer, and the inter-relationship of the molecular weight and the number of carboxyl groups necessary to give the desired colloidal properties to the polymer. Generally more modifying compound is required as the level of unsaturated acid monomer decreases. At high levels of acid monomer it may be possible to attain suitable colloidal properties without any modifier compound. Polymerization modifying agents other than alkyl mercaptans may also be employed in the preferred emulsion polymerization systems. Typical of such alternate modifiers are halogenated compounds such as carbon tetrachloride and tetrafluorethylene. Where the polymer is synthesized in organic solvents, a polymerization modifying compound may not be required if the solvent has inherent chain transferring characteristics.

In the preferred emulsion polymerization there are usually employed one or more surface active agents to partially solubilize the monomers and stabilize the latex polymer particles formed during the polymerization to prevent undue flocculation or coagulation of the polymer. Surfactants which are especially useful are sodium lauroyl sulfate and the dihexyl ester of sodium sulfosuccinic acid. Nonionics, such as the nonyl phenoxy poly(ethyleneoxy) ethanol, are often incorporated for additional stabilization.

There is normally employed a free-radical-generating catalyst to insure polymerization within a reasonable time. Typical of the catalysts which have been found to be useful are potassium persulfate, ammonium persulfate, hydrogen peroxide, lauroyl peroxide, benzoyl peroxide, and 2,2 azo-bis-isobutyronitrile. Where it is desired to accelerate the polymerization reaction or to conduct it at a lower temperature, reducing agents may be employed as is well known in the art.

There may be added to the polymerization system other substances which aid in the polymerization reaction, such as sequestrants, to reduce polyvalent metal ion contamination and buffers to maintain pH at a level of 7 or below in order to facilitate the copolymerization of the acid monomers.

The polymer of this invention produced from the monomers and by the processes aforedescribed is essentially a macromolecular hydrophilic colloid that forms in alkaline aqueous media a reversible colloidal solution that exists in a state of thermodynamic equilibrium. More specifically, the polymer, when dispersed in water at a pH of around 8.5 or greater, forms a colloid solution (hydrosol) wherein the polymer macromolecules are believed to be present in the water in an equilibrium state principally as single molecules and/or aggregations of molecules that can reversibly dissociate to form single molecules. This essentially molecular dispersion of polymer in alkaline aqueous media is a reversible system, that is, it can be destroyed such as by evaporating the water and isolating the polymer and then be regenerated by dispersing the polymer under conditions similar to those originally present. Thus, it is characteristic of the polymer of this invention that the dry form of the polymer can be dissolved in an alkaline aqueous media to give a true colloid solution.

The coating composition of this invention consists essentially of one or more pigments and an adhesive containing as the principal ingredients a mixture of a proteinaceous material and the aforedescribed polymer. The proteinaceous materials which can be utilized in the practice of this invention are naturally occurring or chemically modified polypeptide polymers of relatively high molecular weight, i.e., 20,000 or above, which can be dispersed in an alkaline aqueous medium and which, when cast from such dispersions and dried, give continuous films of good integrity and strength. The most widely used proteinaceous type material employed in coating colors and hence preferred in this invention is casein, although other proteins such as soya protein or zein may be used.

The pigments which may be utilized are those well known in the paper art. These include pigments such as treated or untreated clays and fine flotation clays, precipitated calcium carbonates, talcs, barium sulfates, trihydrate aluminas and calcium sulfoaluminates, titanium dioxides and the zinc oxides.

The coating color, which is a term describing the complete formulation prior to application to the paper, is normally prepared by combining separate preformed solutions of the proteinaceous material and the polymer and mixing this with an aqueous dispersion of the pigment. Solubilization of the preferred proteinaceous material, casein, follows normal paper industry procedures utilizing ammonium hydroxide as the preferred alkalizing agent. The solution of the polymer is prepared by dissolving the polymer, either isolated or in latex form, in a dilute aqueous ammonium hydroxide solution. Both the casein and polymer solutions may be prepared with alkali metal bases such as sodium or potassium hydroxide, but water resistance of coatings made therefrom is reduced. In either the separate or combined casein and polymer solutions, the ammonium hydroxide may partially or completely be replaced with water-soluble mono amines. If used, these amines are desirably volatile or fugitive (i.e., boil below 350° F. at 760 millimeters pressure) in order to gain maximum water resistance in the paper coating. This maximum water resistance is believed to be attained because the volatilization of the preferred ammonium hydroxide or volatile amine after application of the coating color gives a dried coating wherein the polymer of this invention is present essentially in the form of the water-insoluble free acid.

To attain the improved paper coatings of this invention, it is necessary that the combined polymer-protein adhesive solutions in the coating color contain sufficient mono acidic alkaline material, (i.e., ammonium hydroxide, sodium hydroxide, potassium hydroxide or mono amine used to dissolve the protein and polymer) to give an equilibrium pH of about 8.5 or above and preferably a pH of 9 or above. Where the pH of the coating color is appreciably less than 8.5, such as 8.3 or lower, the mixed adhesive composition of this invention decreases in efficiency to the level of the conventional combination of protein and synthetic-latex adhesives presently employed by the paper industry, i.e., there are required 12 or more parts of adhesive per 100 parts of pigment. Though the exact reason for this phenomenon is not understood, it is believed that the increased binding efficiency of the adhesive composition of this invention is related to the colloid solution characteristics demonstrated by the polymer in aqueous alkaline solution at pH of at least 8.5 and more particularly at a pH of 9.0 or above.

Though as mentioned previously, the separate solutions of the casein and polymer are normally combined before mixing with the pigment dispersion, quite satisfactory results may be obtained by sequentially adding to the pigment dispersion first the polymer solution and then the casein solution. Where the casein solution is added first, greater care must be exercised to prevent coagulation of the casein and/or flocculation of the pigment.

In the improved coating colors of this invention, the weight ratio of the proteinaceous material to the polymer can vary widely and still give an adhesive mixture that will function as an acceptable adhesive. Thus it is possible to employ polymer to casein weight ratios varying from as low as 1:9 up to as high as 9:1 and attain improvements in binder efficiency though the ratios normally preferred will vary between 1:4 up to about 4:1 with optimum results obtained at around a 1:2 to 2:1 ratio. The useful range and optimum ratio of polymer to casein cannot be rigidly fixed inasmuch as it depends upon a number of variables, such as polymer composition, type of paper substrate, choice of pigments and conditions of drying the coated paper.

To obtain the maximum advantages of the adhesive of this invention, the aqueous pigment slurry utilized should have a high degree of dispersion, i.e., should contain little or no pigment agglomeration. This degree of dispersion can conveniently be determined with a Hegman "Fine-of-Grind Gauge." With the pigments commonly used in pigment coatings, the aqueous pigment slurry should approach a fineness grind of five and preferably for optimum results should be seven or more. This can be accomplished by dispersing the pigment in water containing dispersing agents, e.g., polyphosphates, such as tetrapotassium and tetrasodium pyrophosphates, sodium hexametaphosphate. The amount of dispersing agent required to minimize pigment agglomeration can be ascertained by adding increments of the dispersing agent until the aqueous pigment dispersion exhibits a rheology most nearly approaching Newtonian and minimum viscosity. With the dispersing agents commonly employed in the paper industry, such as the sodium and potassium phosphates above enumerated, this optimum amount can range widely depending upon the type of pigment or mixture of pigments being dispersed. Typically, there is used between 0.1 to 1.0 part for pigment dispersions. Where coatings containing low electrolyte content are desired, some or all of such conventional dispersing agents may be replaced with some or all of the polymer and/or casein solution in making the aqueous pigment dispersion. The pigment or pigment mixtures are normally mixed with a quantity of water sufficient to give pigment slurries (generally of 50 to 80% total solids) having the rheology characteristics required by the pigment dispersing equipment to give efficient pigment dispersion. To minimize coagulation it is normally desirable to adjust the pH of the pigment slurry to around a pH of 8.5 or more before mixing with the casein and polymer solutions. The importance of adequately dispersing the agglomerates and aggregates of the pigments in the slurries utilized in the coating colors of this invention cannot be overemphasized if maximum pick strength per volume of binder is to be achieved. There are two major reasons for this degree of fineness requirement. One is that the agglomerate has to be broken down so that each possible pigment surface should be exposed initially and thoroughly stabilized by the dispersants in order for the binder or adhesive to subsequently interact with these surfaces and allow sufficient mobility for optimum packing of the pigment particles. Quite obviously, the need of a finely divided pigment dispersion is amplified as the total binder content is reduced as in this invention. In short, it has been found that a crudely prepared pigment dispersion may completely obviate the benefits obtained by using the polymer of this invention.

As previously pointed out, the principal advantages of the new paper coatings of this invention are believed to accrue due to the lower adhesive to pigment ratio which can be obtained with an adhesive consisting essentially of a proteinaceous material and a synthetic polymer having the composition and solubility characteristics aforedescribed. This adhesive to pigment ratio is dependent upon a number of independent variables and hence cannot be narrowly or universally delineated. In the formulation of the paper coatings of this invention some of the principal considerations that determine useful and optimum adhesive-to-pigment levels are:

(a) The nature of the base paper to be coated, i.e., the moisture content, the type and quantity of sizing, the presence of a prime coat and its composition, and the porosity and smoothness of the paper surface.
(b) The type of pigments to be employed in the coating.
(c) The quantity and type of pigment dispersing agent used in making the pigment slurry.
(d) The composition and ratio of the polymer and proteinaceous material that are chosen to form the principal adhesive components of the coating.
(e) The type of coating equipment to be used to apply the coating color.
(f) The processing conditions that will be employed to dry the coating.
(g) The particular physical properties desired in the ultimate coated paper.

Generally, it has been observed that, everything else being equal, the adhesive level can be reduced 10% to 60% with the adhesive composition of this invention as compared to the straight casein or casein/styrene-butadiene almost universally employed in the present art. To illustrate, where a paper base stock prime coated with a pigment-starch coating such as is widely employed in the paper industry is finish coated with a coating color having 85 parts of a fine flotation clay and 15 parts of precipitated calcium carbonate, dried and super calendered utilizing current industry procedues, 7 parts of an adhesive consisting of 3 parts polymer of this invention and 4 parts casein can replace 12 parts of styrene-butadiene, casein adhesive mixture or 16 parts of straight casein to give a fine printing grade paper of equal or superior quality. Depending upon many variables and considerations such as previously enumerated, there will generally be required from about 4 to 10 parts of the adhesive combination of this invention per 100 parts of pigment in finish coatings suitable for good quality, printing-grade paper or paperboard. Higher or lower quantities of the adhesives may be used where special considerations or properties dictate.

In making printing-grade paper and paperboard, the improved pigment coatings of this invention are normally applied to the same type of paper base stocks as are conventionally used by the paper industry with the standard pigment coatings that contain casein, starch, styrenebutadiene or other synthetics, or mixtures thereof as the principal adhesive. Nnormally, this paper base stock consists of a fiber web that has been lightly sized and optionally prime coated, usually with a pigment-starch coating.

The method of applying, drying, and super calendering the coatings of this invention are likewise conventional and can be readily ascertained by those skilled in the art. Thus they can be applied to the paper base stock either on or off the paper machine utilizing such coating applicators as brush coaters, roll coaters, knife coaters and air knife coaters. The coatings are especially suitable for high-speed coating applicators such as the trailing knife blade where high total solids and low viscosity are required. Because of the low adhesive to pigment ratios possible with the adhesive composition of this invention, pigment coating colors having a wide range of total solids and viscosity characteristics can be formulated for ready utilization in any desired coating process.

The weight of the pigment coatings of this invention applied to paper can vary widely, but will generally be of the same order of magnitude for any given type of paper product as are chosen for conventional pigment coatings, varying generally between 5 to 30 pounds per side per ream.

Where desired, the high order of pick adhesive strength and water resistance of the pigment coating of this invention may be further enhanced by crosslinking and/or water insolubilizing the proteinaceous material and/or synthetic polymer with: aldehydes or aldehyde producing substances; low molecular weight, water-dispersible, aminoaldehyde (urea or melamine) or phenol aldehyde type resins; quinone, tannin and salts of zinc, chrominum or aluminum.

In addition to their use as the principal adhesive component in finish pigment coatings for printing-grade paper products, the proteinaceous material synthetic polymer mixtures of this invention likewise may be employed as the sole or principal adhesive both in size and/or prime coats applied to the paper product web normally on the paper machine. Because of their high binding efficiency, these mixtures can be utilized in much lower quantities than normally employed starch adhesives and give paper base stocks having certain superiorities such as water resistance at competitive costs. In this use, the same general considerations as in finish pigment coatings apply, due consideration being given to the different nature of the paper substrate, the further processing conditions, and the intended end use of the coated paper.

With a particular type coating machine, e.g., trailing blade or air knife, the quality of the coating is greatly dependent upon the adhesive. There are some fifteen to twenty different attributes or properties which contribute, in an important manner, to a really good coated paper. About half of these properties are individually significant. The remainder, although not independently significant unless one of them falls below the established minimum, are as a group highly significant. To better understand and appreciate the present invention as illustrated by the examples to follow, it would be well to consider the desirable attributes of a coated paper. The major properties are pigment binding strength, the so-called optical properties, i.e., calendered gloss, opacity and brightness, wet pick strength, wet rub, stiffness, ink setting time, and water retention. Somewhat less important properties are viscosity, optimum application solids, porosity, dusting, odor, varnish holdout and fading.

One of the most important properties of a coated paper is the pigment binding strength. This property is a measurement of the strength of the bond between the particles of the pigment, and between the paper and the coating. It is one of the most important attributes in the determination of the over-all quality of the paper. In effect, what is measured is the printability of the paper in commercial modern ultra-high speed rotary presses. Pigment binding strength is measured by an instrument designated as the IGT printability tester. The instrument, as well as the test for determining pigment binding strength, has been described in the February 1956 issue of the American Pressman. Another instrument used to determine this property of pigment binding strength is the MP print tester and the results obtained on this instrument can be correlated to the results obtained using the IGT tester. The pigment binding strength is determined by increasing the tack of a printing ink and measuring the speed at which picking or removal of the coating occurs. Although the minimum useful value varies with end use, generally the higher the speed the more desirable the adhesive.

The calendered gloss is an important property. In general the higher the gloss the more desirable the coating. The standard test for determining gloss is TAPPI Std. T480m–51. With respect to this property, as well as the pigment binding strength, the standards of comparison are casein color coatings at commercially acceptable adhesive levels as well as combinations with latex.

Opactiy, which is measured by TAPPI Std. T425m–60, should be as high as possible. Brightness is also an important property and the higher it is, the more desirable the coating. It is determined by TAPPI Std. T452m–58. The standards of comparison for both opacity and brightness are the same as given above.

Water retention or the rate at which coating mixtures will release water and adhesive to the base stock is another important property of coating colors. Influenced by the type of adhesives used, water retention may be measured electrically as described in Pulp and Paper, Volume III, James P. Casey, Interscience Publishers, New York, 1952. The relationship between pick strength and water retention is dependent on the porosity of the paper and its resistance to water and the coating methods used. Water retention, furthermore, combines with rheological properties in determining the smoothness of the coating during application to paper.

The following examples wherein all parts are by weight further illustrate the practice of the present invention and are intended for purposes of illustration and not by way of limitation.

Example I

A. POLYMER PREPARATION

A polymer was prepared in a stirred autoclave using the following procedure and weight ratio of ingredients.

One and one-half parts of an emulsifier, dihexyl ester of sodium sulfosuccinic acid, were dissolved in 146 parts of water. This solution was then charged to the autoclave and agitation begun.

Next 20 parts of glacial methacrylic acid, and 10 parts of acrylonitrile were added to the reactor which was then flushed with nitrogen. Thereafter, 64 parts of butadiene were added and the mass heated until a temperature of 117° F. was reached.

At 117° F. a previously prepared solution of 6 parts styrene and 3 parts of t-dodecyl mercaptan, a chain modifier, was charged to the reactor and this was followed by a solution of 2 parts water and 0.3 parts ammonium persulfate. Polymerization was conducted at 117° F. with constant stirring until a 50% conversion of monomer to polymer was attained, approximately 20% solids. At this point the temperature was increased to 150° F.

At approximately 60% conversion, 0.5 part of dodecyl benzene sodium sulfonate dissolved in 2 parts of water was added to the reactor. At 75% conversion, the temperature was increased to 180° F. where it was held for two hours until conversion was substantially complete (about 41% total solids).

The latex was then stabilized by neutralizing the acid polymer with 2½% solution of ammonia to a pH of 7.5 to 8.0. Stripping was then conducted at a 150° F. temperature until the residual monomer content of the material was less than 0.05%.

B. COATING COLOR PREPARATION

A portion, 100 parts of the polymer solid prepared in Example I–A above was diluted with water to an approximate 25% total solids content. Sufficient 14% ammonia was then added to the latex with stirring to solubilize the polymer and give a pH of 9.0.

A pigment masterbatch (65% total solids in water) of 85 parts of a coating clay, 15 parts of precipitated calcium carbonate, and 0.3 part tetrasodium pyrophosphate, was dispersed to a fineness of 5 to 7 on a Hegman gauge and the pH adjusted to 9.0 by addition of ammonium hydroxide. A portion (154 grams) of this paste equivalent to 100 parts dry pigment solids was weighed into a suitable container. Then 26.6 grams of 15% solids ammonium caseinate solution (4 parts dry casein) in water were added to 12 grams of 25% solids polymer solution (3 parts dry polymer solids) and diluted with 45 parts of water to form the final adhesive combination. This mixture was then added with constant slow stirring to 100 parts of the 65% solids pigment slurry or masterbatch. The final coating color was applied in this particular case at a total solids of 45%. This solids may be raised or lowered depending on the rheological characteristics necessitated by the type of coater.

C. COATING APPLICATION AND TESTING

The coating color prepared in B above was applied to a paper base stock prime coated on both sides with a pigment-starch coating by using the appropriate Meyer bars to give a coating weight of 10 pounds per ream per side. The coated sheets were dried by heating with circulating air at 275° F. immediately after coating. The dried sheets were then conditioned for 28 hours at a constant temperature of 77° F. and 50% relative humidity. Calendering (3 nips each side at 1500 p.s.i. steel and cotton-filled rolls) and testing are also conducted under these environmental conditions.

To demonstrate the advantages of the adhesive of the present invention over a standard butadiene-styrene latex combined with casein, a series of coatings, Examples II through XXXIV, was prepared. The even-numbered examples are coating colors of the standard control latex made in the same pigment formulation as given in B of Example I. The odd-numbered examples are coating colors made with the polymer of A of Example I using the pigment formulation and procedures of B of Example I. Examples XXXII through XXXIV show the performance of casein when used alone in the pigment formulation of Example I-B. This series shows the effect of the new polymer when compared to the standard (a conventional latex of this type consists of 40 butadiene and 60 styrene) butadiene-styrene latex adhesive at from 4 to 12 parts of the total adhesive per 100 parts of pigment. The coated papers were conditioned and calendered as in C of Example I and tested for IGT pick using 4-Tack printing ink. Electrical water retention tests were conducted. The optical properties, 75° gloss, brightness and opacity were also determined. These results are reported in Table I.

by at least 50% and produces a coating which meets the strength and quality specifications of the paper and printing industries at adhesive levels much too low (i.e., 6 parts adhesive per 100 parts of pigment) for standard latices.

To demonstrate further the uniqueness of the polymers of this invention and the greatly enhanced adhesive properties it imparts to proteinaceous materials, another series of coating colors was prepared in order to compare the polymer as made in Example I-A to a cross-sectional variety of commercial latices used currently in the paper industry. This includes the high, low and noncarboxylated butadiene-styrenes, the acrylics and a polyvinyl acetate. The coating colors for all fourteen examples were again compounded as shown in Example I-B and applied to the prime-coated paper base stock as in Example I-C. The IGT pick results using a No. 4 Tack ink at high speed and a 50 kilogram weight are shown in Table II in order of decreasing strength.

TABLE II

| Example | Synthetic Binder | Parts by Weight of Synthetic Binder | Parts by Weight of Casein | (4 Tack-B Speed, 50 kg.) IGT Pick |
|---|---|---|---|---|
| XXXV | Polymer IA | 2 | 5 | 411 |
| XXXVI | Latex 2 | 2 | 5 | 195 |
| XXXVII | Latex 3 | 2 | 5 | 163 |
| XXXVIII | Latex 4 | 2 | 5 | 133 |
| XXXIX | Latex 5 | 2 | 5 | 123 |
| XL | Latex 6 | 2 | 5 | 121 |
| XLI | Casein 7 | 0 | 7 | 115 |
| XLII | Latex 8 | 2 | 5 | 83 |
| XLIII | Latex 9 | 2 | 5 | 73 |
| XLIV | Latex 10 | 2 | 5 | 73 |
| XLV | Latex 11 | 2 | 5 | 58 |
| XLVI | Latex 12 | 2 | 5 | 48 |
| XLVII | Latex 13 | 2 | 5 | 43 |
| XLVIII | Latex 14 | 2 | 5 | 41 |

An examination of the above table clearly shows that:

TABLE I.—COMPARISON DATA OF COATINGS AT VARIOUS BINDER LEVELS ON 100 PARTS OF PIGMENT

| Example | Parts by Dry Weight | | Casein | IGT Pick | 75° Gloss | Brightness | Opacity | Water Retention (seconds) |
|---|---|---|---|---|---|---|---|---|
| | Invention Polymer A | Standard Latex[1] | | | | | | |
| II | | 5 | 7 | 240 | 78.8 | 77.0 | 91.6 | 7.8 |
| III | 5 | | 7 | 465 | 74.2 | 76.6 | 93.1 | 10.4 |
| IV | | 4 | 7 | 195 | 76.6 | 75.7 | 91.8 | 13.5 |
| V | 4 | | 7 | 365 | 74.9 | 77.5 | 93.1 | 13.8 |
| VI | | 3 | 7 | 160 | 77.2 | 77.8 | 92.1 | 12.4 |
| VII | 3 | | 7 | 331 | 76.6 | 78.0 | 94.2 | 14.6 |
| VIII | | 2 | 7 | 175 | 76.8 | 77.5 | 92.1 | 14.4 |
| IX | 2 | | 7 | 345 | 77.9 | 77.4 | 94.1 | 16.0 |
| X | | 1 | 7 | 115 | 77.2 | 77.1 | 92.3 | 13.2 |
| XI | 1 | | 7 | 255 | 77.3 | 77.5 | 93.3 | 15.8 |
| XII | | 4 | 6 | 233 | 74.5 | 76.6 | 92.5 | 5.6 |
| XIII | 4 | | 6 | 418 | 72.1 | 77.3 | 93.5 | 12.8 |
| XIV | | 3 | 6 | 183 | 74.9 | 78.0 | 93.0 | 5.6 |
| XV | 3 | | 6 | 403 | 75.2 | 77.3 | 92.8 | 12.2 |
| XVI | | 2 | 6 | 90 | 76.0 | 77.5 | 92.1 | 5.0 |
| XVII | 2 | | 6 | 345 | 75.0 | 78.2 | 94.6 | 11.7 |
| XVIII | | 1 | 6 | 20 | 76.1 | 78.5 | 92.6 | 5.0 |
| XIX | 1 | | 6 | 150 | 76.1 | 78.5 | 93.5 | 13.4 |
| XX | | 3 | 5 | 140 | 78.0 | 78.0 | 93.3 | 6.5 |
| XXI | 3 | | 5 | 390 | 76.8 | 78.1 | 94.8 | 12.2 |
| XXII | | 2 | 5 | 45 | 77.9 | 78.0 | 92.7 | 4.6 |
| XXIII | 2 | | 5 | 380 | 79.6 | 78.0 | 93.0 | 14.6 |
| XXIV | | 1 | 5 | 0 | 77.8 | 78.5 | 92.6 | 6.4 |
| XXV | 1 | | 5 | 148 | 77.5 | 78.5 | 93.3 | 13.4 |
| XXVI | | 3 | 4 | 180 | 76.0 | 76.6 | 92.5 | 5.8 |
| XXVII | 3 | | 4 | 470 | 74.0 | 75.0 | 93.2 | 12.8 |
| XXVIII | | 2 | 4 | 0 | 77.9 | 78.5 | 91.8 | 4.0 |
| XXIX | 2 | | 4 | 210 | 77.9 | 78.5 | 93.5 | 12.4 |
| XXX | | 3 | 3 | 0 | 78.0 | 76.5 | 92.0 | |
| XXXI | 3 | | 3 | 305 | 76.0 | 76.4 | 93.4 | 11.8 |
| XXXII | | | 7 | 55 | 76.4 | 77.9 | 93.3 | 5.5 |
| XXXIII | | | 6 | 0 | 77.9 | 78.5 | 92.9 | 4.5 |
| XXXIV | | | 5 | 0 | 78.7 | 78.5 | 93.8 | 4.9 |

[1] Standard butadiene-styrene latex adhesive used in paper coating.

An examination of the results recorded in Table I indicates that the substitution of the polymer of this invention for the butadiene-styrene latex conventionally used increases the pick strength of a synthetic binder/casein combination at high adhesive to pigment ratios (1) Replacing only two parts of a straight casein system at an adhesive level of 7 parts by weight per 100 parts by weight of pigment with the polymer of this invention increases the pick strength value of the coating by over 200%.

(2) Replacing two parts of a synthetic latex polymer in a latex-casein combination increases the pick strength value of the coating at least 100% as compared with the strongest of the 12 latices tested.

Examples XLIX to LII

A further series of polymers was prepared as in Example I except that the amounts of reactants set out in Table III were used. Coatings using these polymers were prepared and applied to paper as in Example I–B and C. When tested, as in Example I, the following results were obtained. Example XLIX, which is illustrative of a butadiene content lower than the claimed range, demonstrates that such a polymer has a pick strength of 200 feet per minute which would render it unsatisfactory in many commercial applications.

TABLE III

| Examples | XLIX | L | LI | LII |
| --- | --- | --- | --- | --- |
| Butadiene | 44 | 70 | 58 | 64 |
| Styrene | 26 | | 6 | 6 |
| Methacrylic acid | 20 | 20 | 26 | 17 |
| Acrylonitrile | 10 | 10 | 10 | 10 |
| Tertiary dodecylmercaptan[1] | 3 | 3 | 3 | 3 |
| Fumaric acid | | | | 3 |

[1] Or any other known chain modifier, e.g., tertiary nonyl or octyl mercaptan.

Example L is illustrative of another polymer within the composition claimed which gave satisfactory pigment coated papers.

The polymer of Example LI which had a higher methacrylic acid content exhibited an increased pick value.

In Example LII, Example I was repeated except that 3 parts of fumaric acid were substituted for a portion of the methacrylic acid. Substantially similar results were obtained.

A further series of examples was run as above except that the amounts and kinds of ingredients listed in Table IV below were used.

TABLE IV

| Examples | LIII | LIV | LV | LVI |
| --- | --- | --- | --- | --- |
| Isoprene | | 64 | | |
| Butadiene | 64 | | 64 | 58 |
| Styrene | 6 | 6 | 6 | |
| Methacrylic acid [1] | 20 | 20 | 17 | 20 |
| Acrylonitrile | 10 | 10 | 10 | 10 |
| Tertiary dodecyl mercaptan | | 3 | 3 | 3 |
| Carbon tetrachloride [2] | 3 | | | |
| Itaconic acid | | | 3 | |
| Methyl methacrylate | | | | 12 |

[1] Small amounts of dicarboxyl olefinic acid, e.g., fumaric and itaconic or half esters of fumaric maleic and itaconic acid may be used to replace part of methacrylic acid.
[2] Or brominated or partially brominated hydrocarbons, e.g., 12c, dibromo-1, 1-dichloroethane.

Paper coatings were prepared as above and the following observations were made. Example LIII had a lower odor content due to the substitution of the carbon tetrachloride for the mercaptan used. Example LIV illustrates the substitution of isoprene for butadiene. The results were substantially the same as that obtained in Example I. It might be noted that the use of isoprene permits polymerization to be carried out without recourse to high pressure vessels.

Example LV illustrates a combination of acids, i.e., methacrylic and itaconic. The results obtained in the paper coating were comparable to that of Example I.

LVI is an example of a polymer containing methylmethacrylate. The resulting paper shows a higher order of resistance to light discoloration.

Other substitutions of various ingredients may be made. It is also to be observed that various emulsifiers, catalysts and chain regulators may be used.

The polymer of this invention, besides forming a superior pigment coating adhesive in combination with proteinaceous materials, can likewise be utilized in admixture with water-soluble starches as the principal adhesive in pigment coatings to give coated papers having enhanced physical properties as compared to coated papers which use starch or starch-synthetic latex polymers as the adhesive.

Though the increased binding efficiency in paper coatings demonstrated by the polymer of this invention when used in combination with proteinaceous materials is not understood, it is theorized that it may be due to its unique composition and colloidal nature which cause it to act with proteinaceous adhesives synergistically to give unique and superior properties to coated papers. The polymer, for example, has an unusual affinity for water in a wet coating color. This water-holding property may contribute to the control of the penetration and anchoring of the coating to the paper substrate both before and during the drying step. This control is thought to be an important factor in the reduced binder levels obtainable with the adhesive of this invention. Secondly, the exceptional strength of the new coating, as measured by I.G.T. Pick, a desirable attribute in high speed printing, is maintained at these low binder levels because it is speculated the polymer when solvated in an alkali aqueous media is present as highly swollen particles and/or uncoiled molecular chains that are believed to allow a more perfect packing of the coating components during film formation.

The foregoing description has pointed out the improved polymer adhesive and paper coating which results in the practice of this invention. The use of the invention permits the attainment of desirable characteristics in a finished coated paper at lower adhesive levels than previously possible.

What is claimed is:

1. A pigment-coated paper product which comprises a paper product base having thereon a coating obtained by removing substantially all the water from a previously applied aqueous dispersion comprising
   (a) a binder consisting essentially of
      (1) the emulsion-polymerized solid polymer consisting of by weight, 54 to 82% of an unsubstituted or mono halogen-substituted conjugated diene having 4 to 8 carbon atoms, 14 to 30% of a copolymerizable alpha, beta, mono ethylenically unsaturated carboxylic acid, 4 to 15% of a copolymerizable alpha, beta, mono ethylenically unsaturated nitrile, and 0 to 28% of a copolymerizable vinylidene compound that forms in an alkaline aqueous media at a pH of 8.5 or more a reversible colloidal solution existing in a state of thermodynamic equilibrium, and
      (2) a proteinaceous material essentially soluble in an alkaline aqueous media at a pH of 8.5 or more,
   (b) a finely divided pigment,
   (c) water, and
   (d) sufficient mono acidic alkaline material selected from the group consisting of ammonium hydroxide, sodium hydroxide, potassium hydroxide and water soluble mono amines to give the aqueous dispersion an equilibrium pH of at least 8.5.

2. The pigment-coated paper product of claim 1 wherein the binder consists essentially of 10 to 90% by weight of the solid polymer and 90 to 10% by weight of the proteinaceous material.

3. The pigment-coated paper product of claim 1 wherein there is used per 100 parts of the finely-divided pigment, 4 to 20 parts of a binder consisting essentially of 20 to 80% by weight of the proteinaceous material and 80 to 20% by weight of the solid polymer.

4. The pigment-coated paper product of claim 3 wherein the proteinaceous material is casein or soya protein.

5. The pigment-coated paper product of claim 4 wherein the solid polymer is obtained by the emulsion polymerization of a monomer mixture consisting of 54 to 82 parts of butadiene, isoprene or chloroprene, 14 to 30 parts of acrylic acid or methacrylic acid, 4 to 15 parts of acrylonitrile or methacrylonitrile, and up to 28 parts of a copolymerizable vinylidene compound.

6. The pigment-coated paper product of claim 5 wherein the copolymerizable vinylidene compound is styrene, alpha methyl styrene, vinyl toluene or methyl methacrylate.

7. The pigment-coated paper product of claim 6 wherein the mono acidic alkaline material is ammonium hydroxide.

References Cited

UNITED STATES PATENTS

| | | | |
|---|---|---|---|
| 2,395,017 | 2/1946 | Semon | 260—80.7 |
| 2,724,707 | 11/1955 | Brown | 260—80.7 |
| 3,081,198 | 3/1963 | Miller | 260—8 |
| 3,296,226 | 1/1967 | McCoy et al. | 260—80.7 |

FOREIGN PATENTS 888,503    1/1962    Great Britain.

WILLIAM H. SHORT, *Primary Examiner.*

S. M. BLECH, *Examiner.*

E. M. WOODBERRY, *Assistant Examiner.*